US005525269A

United States Patent [19]
Connolly et al.

[11] Patent Number: 5,525,269
[45] Date of Patent: Jun. 11, 1996

[54] IMPELLER TIPLETS FOR IMPROVING GAS TO LIQUID MASS TRANSFER EFFICIENCY IN A DRAFT TUBE SUBMERGED TURBINE MIXER/AERATOR

[75] Inventors: John R. Connolly, Lebanon; David E. Gibson, Hummelstown; Ronnie G. Thompson, Annville, all of Pa.

[73] Assignee: Philadelphia Gear Corporation, King of Prussia, Pa.

[21] Appl. No.: 363,303

[22] Filed: Dec. 22, 1994

Related U.S. Application Data

[63] Continuation of Ser. No. 60,487, May 11, 1993, abandoned, which is a continuation of Ser. No. 602,394, Oct. 18, 1990, abandoned, which is a continuation of Ser. No. 331,098, Mar. 27, 1989, abandoned, which is a continuation of Ser. No. 60,047, Jun. 8, 1987, abandoned, which is a continuation of Ser. No. 835,459, Mar. 3, 1986, abandoned, which is a continuation-in-part of Ser. No. 715,014, Mar. 22, 1985, abandoned.

[51] Int. Cl.[6] .................................. B01F 5/12; B01F 7/22
[52] U.S. Cl. .......................... 261/93; 366/264; 366/270; 366/330.1
[58] Field of Search .................................. 366/262, 270, 366/330, 343, 325, 264, 330.1; 416/179, 189 R, 189 B, 223 R, 235, 236 R, 236 A; 422/227; 210/219, 220; 261/91, 93

[56] References Cited

U.S. PATENT DOCUMENTS

| | | | |
|---|---|---|---|
| 170,937 | 12/1875 | Cook et al. ......................... | 416/236 X |
| 695,389 | 3/1902 | Hammond ........................... | 416/236 A |
| 725,877 | 4/1903 | Rommeney ......................... | 366/270 X |
| 885,174 | 4/1903 | Perkins ............................... | 416/238 |
| 971,409 | 9/1910 | Roggenbuck ....................... | 416/236 A |
| 1,022,203 | 4/1912 | Nettle .................................. | 416/236 |
| 1,066,988 | 7/1913 | Boutwell ............................. | 416/236 A |
| 1,386,835 | 8/1921 | Birkett . | |
| 1,411,038 | 3/1922 | Komarek ............................. | 416/202 |
| 1,593,516 | 7/1926 | Sutter .................................. | 416/238 |
| 1,955,929 | 4/1934 | Mueller ............................... | 416/235 X |
| 2,059,650 | 11/1936 | Pfau .................................... | 253/117 |
| 2,148,555 | 2/1939 | Hicks .................................. | 170/159 |
| 2,426,742 | 9/1947 | Pawlowski .......................... | 170/168 |
| 2,769,623 | 11/1956 | Cawood .............................. | 259/134 |
| 2,950,171 | 8/1960 | Macq .................................. | 23/165 |
| 2,991,983 | 7/1961 | Logan ................................. | 259/97 |
| 3,092,678 | 6/1963 | Braun .................................. | 261/30 |
| 3,166,303 | 1/1965 | Chapman ............................ | 259/135 |
| 3,168,255 | 2/1965 | Bellows et al. .................... | 241/46 |
| 3,171,495 | 3/1965 | Puckett ............................... | 170/170 |
| 3,204,768 | 9/1965 | Daniel ................................. | 210/197 |
| 3,416,729 | 12/1968 | Ravitts et al. ...................... | 261/91 X |
| 3,532,327 | 10/1970 | Landberg ............................ | 259/95 |
| 3,737,288 | 6/1973 | Hochman ............................ | 23/285 |
| 3,893,920 | 7/1975 | Hubbard et al. ................... | 210/197 |

(List continued on next page.)

FOREIGN PATENT DOCUMENTS

| | | |
|---|---|---|
| 756252 | 3/1971 | Belgium ................................. 261/93 |
| 311712 | 10/1933 | Italy . |
| 59-185898 | 10/1984 | Japan ..................................... 416/235 |
| 7806626 | 12/1979 | Netherlands . |
| 25882 | of 1905 | United Kingdom . |
| 24066 | 10/1913 | United Kingdom ................. 416/235 |
| 134701 | 11/1919 | United Kingdom . |
| 500266 | 10/1927 | United Kingdom . |

OTHER PUBLICATIONS

Article entitled "Practical Results with TVF Propeller", p. 21, Apr., 1984 issue of *Marine Propulsion International*.
Article entitled "Prop Options", by Price, p. 33 of Oct. 1984 issue of *Aero Magazine*.

Primary Examiner—Charles E. Cooley
Attorney, Agent, or Firm—William H. Murray

[57] ABSTRACT

A vertical draft tube submerged turbine mixer/aerator includes an impeller rotatedly disposed within the draft tube above an aerator. A single tiplet extends downwardly from the lower surface of each impeller blade in proximity to the blade tip for improving gas to liquid mass transfer efficiency of the mixer/aerator.

5 Claims, 5 Drawing Sheets

U.S. PATENT DOCUMENTS

| | | | |
|---|---|---|---|
| 4,089,620 | 5/1978 | Ravitts | 417/61 |
| 4,155,602 | 5/1979 | Quick | 406/104 |
| 4,189,281 | 2/1980 | Katagiri et al. | 415/213 |
| 4,222,710 | 9/1980 | Katagiri et al. | 416/236 A |
| 4,249,863 | 2/1981 | Connolly et al. | 416/185 |
| 4,265,596 | 5/1981 | Katagiri et al. | 416/236 A |
| 4,288,223 | 9/1981 | Gonzalez et al. | 440/71 |
| 4,358,206 | 11/1982 | Schutte | 366/262 |
| 4,468,130 | 8/1984 | Weetman | 366/330 |

PRIOR ART

IMPELLER TIPLETS FOR IMPROVING GAS TO LIQUID MASS TRANSFER EFFICIENCY IN A DRAFT TUBE SUBMERGED TURBINE MIXER/AERATOR

This application is a continuation of U.S. patent application Ser. No. 08/060,487, filed May 11, 1993, now abandoned; which is a continuation of U.S. patent application Ser. No. 07/602,394, filed Oct. 18, 1990, now abandoned; which is a continuation of U.S. patent application Ser. No. 07/331,098 filed Mar. 27, 1989, now abandoned; which is a continuation of U.S. patent application Ser. No. 07/060,047, filed Jun. 8, 1987, now abandoned; which is a continuation of U.S. patent application Ser. No. 06/835,459, filed Mar. 3, 1986, now abandoned; which is a continuation-in-part of U.S. patent application Ser. No. 06/715,014, filed Mar. 22, 1985, now abandoned.

BACKGROUND OF THE INVENTION

The present invention relates to mechanical fluid mixing apparatus and particularly to impeller apparatus and draft tube apparatus for mixing fluids and liquids having particles suspended therein, and for pumping and aerating liquids. Impeller apparatus in accordance with the present invention is particularly suitable for use in draft tube mixing apparatus for wastewater and sewage sludge treatment, as well as in industrial and chemical processes for the treatment and conversion of chemicals and minerals.

Draft tube mixers have been used to provide controlled flow of fluids, including liquid-particle suspensions, in order to effect the mixing thereof. In addition, draft tube mixers, in conjunction with gas introduction means such as air sparging devices, have been in use in order to effect mass transfer from a gas, for example air or oxygen, to the mixed fluid in the mechanical aeration thereof.

Draft tube mixers typically comprise a substantially vertically oriented draft tube, having an axial flow impeller rotatably disposed therein. The draft tube and impeller are typically submerged beneath the surface level of the fluid to be mixed. The impeller is rotated by drive means, for example an electric motor connected to the impeller shaft through a geared or other speed reducing drive, in order to mix the fluid and pump it through and out of the draft tube. For gas to liquid transfer applications, for example aeration of a mixed liquor, an air sparging device may be positioned in the draft tube beneath the impeller. Rotation of the impeller mixes the liquor and pumps it downwardly through the draft tube past the air sparging device thereby creating a flow of aerated mixed liquor. Such apparatus is useful, for example, in biological wastewater treatment systems which require oxygenation and mixing of the liquid medium.

It has been found that axial flow pumping efficiency is detrimentally affected due to turbulence and backflow which may exist between the tips of the impeller blades and the surrounding draft tube. One way of decreasing the turbulence and backflow, thereby increasing the axial flow pumping efficiency in a draft tube apparatus, is to maintain minimal clearance tolerances between the tips of the impeller blades and the interior circumference of the surrounding draft tube. This solution is unsatisfactory due to additional cost of equipment required to achieve and maintain such close tolerances.

It has also been found that the turbulence and backflow contribute to a drastic reduction in the effectiveness of draft tube mixing aerators due to premature flooding of the submerged turbine. That is, the operation of the apparatus reaches a point at which the buoyancy of the air introduced through the air sparging device overcomes the downward pumping of liquid regime promoted by the impeller, thereby severely reducing the mixing and oxygen transfer efficiency of the system.

Figure 1:
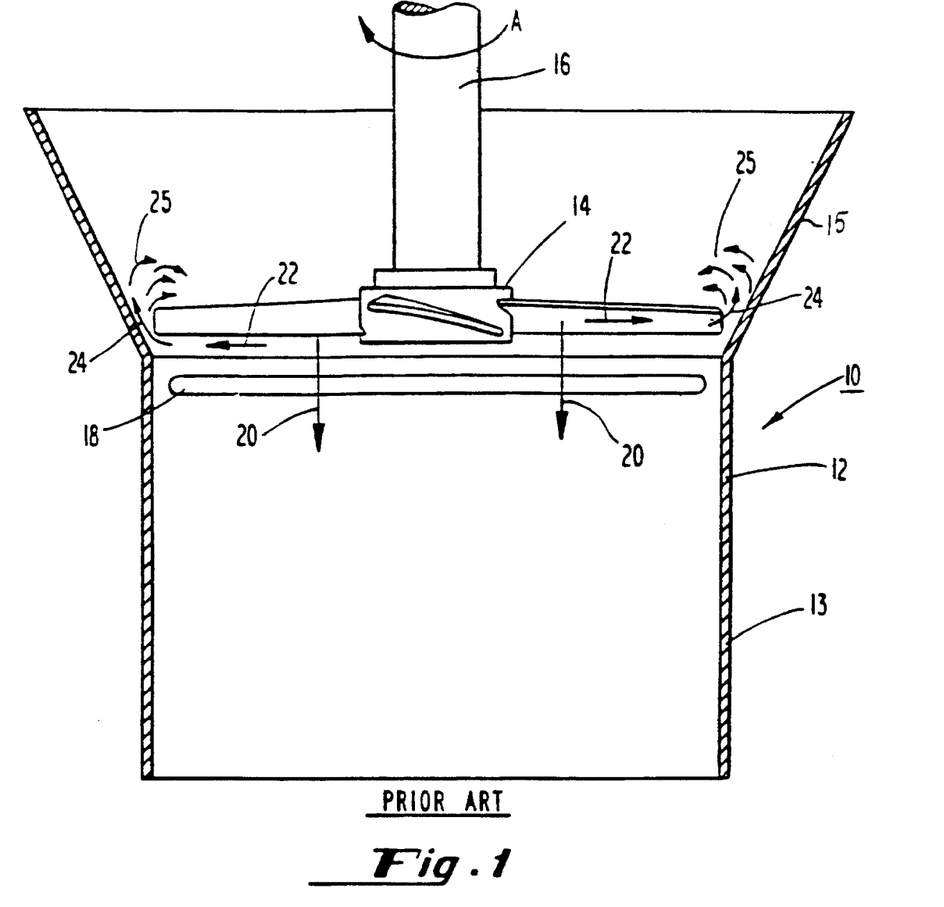
FIG. 1 is a partially sectioned elevational view of a prior art draft tube mixer/aerator.

Conditions which are believed to contribute to flooding are depicted in FIG. 1, which shows a draft tube submerged turbine aerator apparatus, in accordance with the prior art, generally designated 10. The apparatus 10 comprises a draft tube 12 having a cylindrical portion 13 and a conical portion 15. An impeller 14 is rotatably disposed within the draft tube 12 just above the intersection between the conical portion 15 and cylindrical portion 13 of the draft tube 12. The impeller 14 is connected by a vertical shaft 16 to rotating means, for example an electric motor driven geared or other speed reducing drive (not shown). An air sparging device 18 is disposed within the cylindrical portion 13 of the draft tube 12 beneath the impeller 14.

Ideally, rotation of the impeller 14 in the direction shown by arrow A draws fluid into the conical portion 15 and causes the fluid to be pumped axially downward past the air sparging device 18 through the cylindrical portion 13 and out of the bottom end thereof. In actual operation, however, rotation of the impeller 14 in the direction shown by arrow A forces the fluid downwardly and outwardly in directions indicated by arrows 20 and 22 respectively. The outward fluid flow component strikes the inner circumference of the draft tube 12, and more particularly in the embodiment shown in FIG. 1 strikes the canted interior surface of the conical portion 15, causing a portion of this outward flowing fluid to be directed upwardly as indicated generally by arrows 24. This upward or reverse fluid flow creates turbulence as well as backflow in a manner schematically illustrated by arrows 25. This turbulence and backflow reduces the axial flow pumping efficiency of the apparatus.

Introduction of compressed air by the sparging device 18 into the liquid exacerbates the problem of reduced axial flow pumping efficiency by creating an upward, or reverse flow component due to the buoyancy of the air, which the impeller 14 must overcome in order to pump the liquid downwardly through and out of the draft tube 12. As the volume of compressed air increases, the upward force component created by the compressed air increases and acts to combine with the upward component of the liquid flowing between the tips of the impeller blades and the inner circumference of the draft tube 12. This combination continues to exert a resultant upward force which increases as the volume of the compressed air increases. When this resultant upward force prevails over the downward force of the fluid pumped by the impeller 14, the flooding condition occurs.

It has also been found that the composition of the fluid can have a detrimental effect on the operation of the apparatus. In particular, certain foreign objects in wastewater, such as rags, strings, and the like, tend to accumulate on the leading edges of the impeller blades thereby creating a reduction in pumping efficiency and air dispersion capacity; while, at the same time, causing an increase in the power drawn by the electric motor used to rotate the impeller. Although the foreign objects will disengage from the impeller blades when the apparatus is shut down, they will gradually reaccumulate thereon following restart.

SUMMARY OF THE INVENTION

Consequently, it is an object of the present invention to provide an improved impeller for use in mixing liquids or fluid suspension media containing foreign objects.

It is an additional object of the present invention to provide an improved mixing apparatus having increased pumping and mixing efficiency and which is operable in wastewater containing foreign objects.

It is another object of the present invention to provide a draft tube submerged turbine mixer/aerator with increased levels of oxygen transfer efficiency and mixing capabilities and which does not exhibit a significant reduction in such capabilities in debris-filled secondary wastewater treatment applications.

It is a further object of the present invention to provide an improved draft tube mixing apparatus which does not exhibit an increase in power draw in such wastewater treatment applications.

It is still another object of the present invention to provide a draft tube submerged turbine mixer/aerator having an increased level of axial flow pumping efficiency.

It is yet another object of the present invention to provide a draft tube submerged turbine mixer/aerator having an improved impeller which minimizes the accumulation of foreign objects on the blades thereof.

It is a further object of the present invention to provide a draft tube submerged turbine mixer/aerator having an impeller which provides improved axial fluid flow characteristics through the draft tube.

It is still another object of the present invention to provide a draft tube mixing apparatus having improved axial flow pumping and mixing efficiency without the necessity of maintaining excessively close tolerances between the tips of the impeller blades and the surrounding draft tube.

Briefly described, the foregoing objects are achieved by providing an impeller apparatus for use in mixing liquids or fluid suspension media, the impeller comprising a hub having an axis of rotation, a plurality of blades extending outwardly from the hub in a direction lateral to the axis of rotation, and means disposed adjacent the tip of each of the blades for deflecting lateral flow of the liquid or fluid media toward a direction which is substantially parallel to the axis of the rotation. In one embodiment, the outwardly extending blades are swept back from a radial orientation by a predetermined sweep back angle.

DETAILED DESCRIPTION OF THE PREFERRED EMBODIMENT

Figure 2:
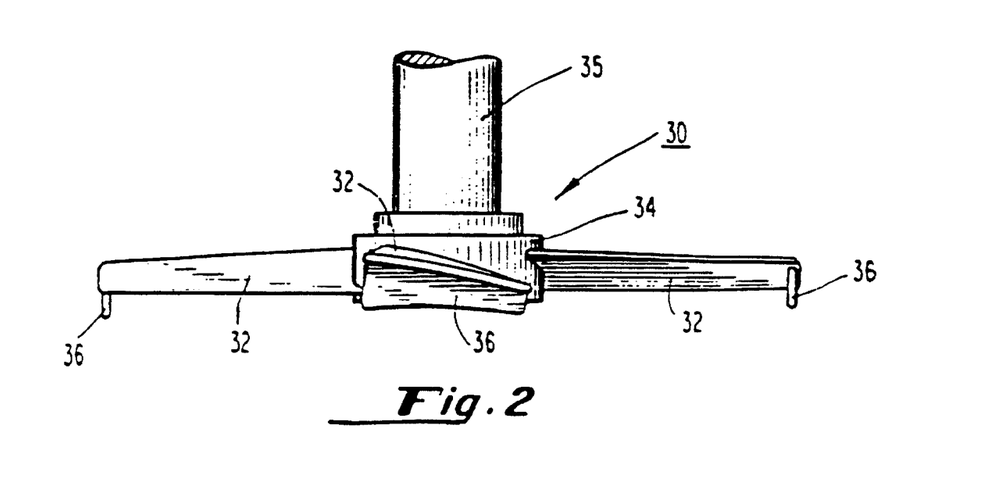
FIG. 2 is a side elevational view of one embodiment of an impeller having tiplets mounted thereon in accordance with the present invention.
Figure 3:
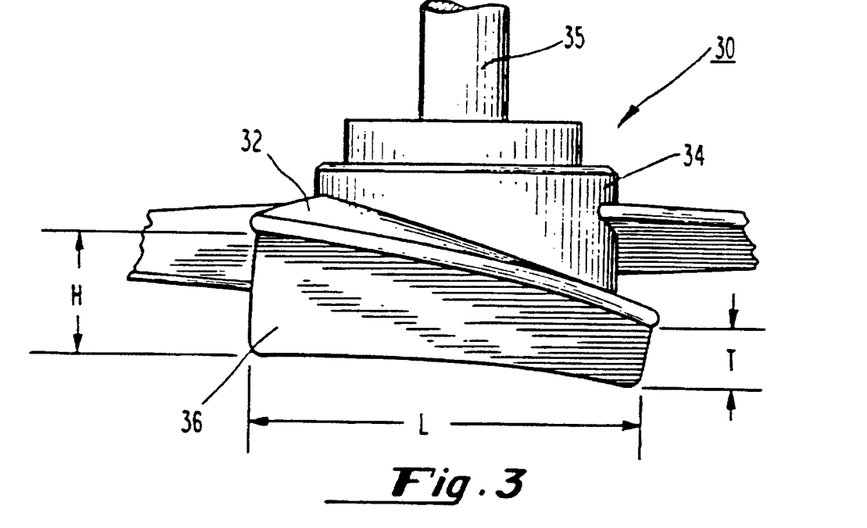
FIG. 3 is an enlarged elevational view of an end of an impeller blade depicting the tiplet mounted thereon in accordance with a preferred embodiment of the present invention.

Referring now to FIG. 2, there is shown an impeller, generally designated 30. The impeller 30 comprises a plurality of impeller blades 32 connected to a hub 34 which is disposed at the end of a shaft 35 having a longitudinal axis of rotation. The hub 34 also has an axis of rotation which is substantially coaxial with the longitudinal axis of the shaft 35. The blades 32 extend outwardly from the hub 34 in a direction lateral to and radial from the axis of rotation of the hub 34. It is preferred that these blades be three in number, disposed 120 degrees apart around the hub 34. However, other arrangements of blades may be use, for example, four blades may be bolted onto ears extending from and disposed 90 degrees apart around the hub; and such arrangements are also deemed to come within the scope and contemplation of the present invention. A tiplet 36 is attached to and is disposed downwardly from the lower surface of each impeller blade 32 in proximity to the tip thereof. It is preferred that the tiplet 36 span substantially the entire width of the impeller blade 32 as shown in FIGS. 2 and 3. Furthermore, it is preferred that the tip of the impeller blade 32 as well as the tiplet 36 depending therefrom have a radius of curvature which is substantially equal to that of the circle the tiplet describes when the impeller is rotating. In one embodiment, where the impeller diameter is approximately equal to 86 inches and each blade has as width of approximately 27 inches, the height H at the leading edge is approximately 4.5 inches; the height T at the trailing edge is approximately 2.5 inches; and the length L is approximately 27 inches (see FIG. 3).

Figure 4:
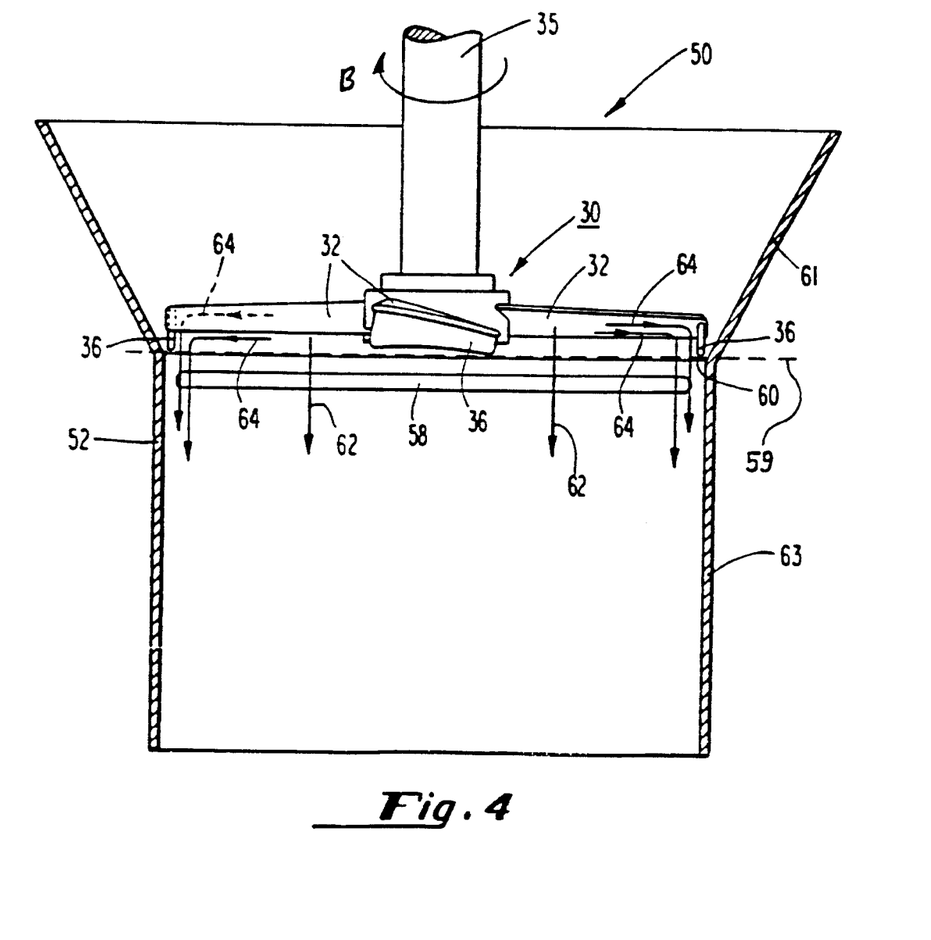
FIG. 4 is a partially sectioned elevational view of the impeller of FIG. 2 rotatably disposed within a draft tube.

Referring now to FIG. 4, there is shown a draft tube submerged turbine aerator, generally designated 50, having an impeller 30 rotatably disposed within a draft tube 52 in accordance with the present invention. The impeller 30 is connected by the vertical shaft 35 to an electric motor through a geared or other speed reducing drive (not shown). An air sparging device 58 is disposed within the draft tube 52 beneath the impeller 30 preferably in close proximity thereto. In the embodiment depicted in FIG. 4, the draft tube 52 comprises a conical portion 61 and a cylindrical portion 63. The air sparging device 58 may assume the configuration of spokes emanating from a central hub coaxially disposed within the draft tube or projecting inwardly from the draft tube wall, outside of which is a circular manifold; or may be a ring-shaped device; or a combination of the two; or may assume any other configuration known to those skilled in the art.

Rotation of the impeller 30 in the direction shown by arrow B forces the fluid downwardly and outwardly in the directions indicated by arrows 62 and 64 respectively. However, in accordance with the present invention, the tangential, outward fluid flow component 64 is directed downwardly by the tiplets 36 causing the resultant net flow to be substantially entirely in the downward axial direction past the sparging device 58. This is contrasted with prior art apparatus depicted in FIG. 2 in which the tangential, outwardly directed component 22 of fluid flow impacts the surrounding draft tube, thereby causing a portion 24 of such flow to be directed upwardly around the tips of the impeller blades as previously described in conjunction with FIG. 1.

It is preferred that the impeller of the present invention be mounted within the draft tube 52 such that the shaft 35 is substantially coaxial with the central longitudinal axis of the draft tube 52 and the lower edges of the tiplets 36 are substantially coplanar 59 with the intersection 60 of the conical portion 61 with the cylindrical portion 63 of the draft tube 52 as shown in FIG. 4. In accordance with such arrangement, the tiplets 36 substantially reduce the impact of the tangential fluid flow component 64 against the conical interior of the draft tube 52. Although such positioning as shown is preferred, the impeller may also be disposed above the intersection 60 and still gain the advantages of the present invention since the tiplets 36 serve to redirect the tangential flow 64 to the axial direction 62 past the lower conical surface into the cylindrical portion 63 of the draft tube 52.

By using the tiplets in accordance with the present invention, practically all the tangentially flowing fluid is directed downwardly by the tiplets thereby increasing the net downward flow and minimizing turbulence and backflow at and around the tips of the impeller blades. This net increase in downward flow and the substantial elimination of backflow and turbulence increases the axial flow pumping efficiency of the apparatus. In those applications where aeration is required, the net increase in downward flow and the substantial elimination of turbulence and backflow which is accomplished by the tiplets of the present invention overcomes the upward force imparted by the buoyancy of the injected air to a greater extent than prior art apparatus, thereby permitting increased air flow into the system before the flooding stage is attained. Consequently, it can be seen that by utilizing the tiplets of the present invention, increased pumping and mixing efficiency is attained. Furthermore, in contrast with the prior art apparatus utilized in those applications where mass transfer to the pumped liquid is required, use of the tiplets of the present invention not only increases pumping and mixing efficiency but also increases gas dispersion efficiency. Gas dispersion efficiency is the capability of an aerator/mixer to handle a gas without losing is capability of handling the primary liquid flow. That is, the maximum gas flow in SCFM divided by the aerator/mixer horsepower (i.e., SCFM/SP). The greater the gas flow (SCFM), the greater the gas dispersion efficiency. The greater the gas dispersion efficiency, the greater will be the gas to liquid mass transfer. In aeration applications where the gas is air, the greater the gas dispersion efficiency, the greater will be the oxygen transfer.

The above can be clearly shown by reference to Table 1 which lists the relative gas dispersion capability and relative increase of gas dispersion capability compared to consumed power increase for different embodiments of the present invention compared against an unmodified, prior art hydrofoil impeller. All measurements were made utilizing an 86 inch diameter hydrofoil impeller. The performance listed in Table 1 is normalized with respect to an unmodified prior art hydrofoil impeller listed in the top row. The second row lists the increased relative gas dispersion capability and such capability compared to consumed power increase for the hydrofoil impeller modified in accordance with an embodiment of the present invention. In this embodiment, the tiplets were in proximity to the tips of the impeller blades, spanning the width thereof and extending downwardly approximately 2.5 inches from the lower surface of the impeller blade.

As can be seen from Table 1, there was an increase of approximately 11.3 percent in the relative gas dispersion capability over the prior art impeller. Furthermore, there was a relative increase of approximately 7.5 percent of gas dispersion capability compared to consumed power increase from that measured on the system utilizing the prior art impeller. In the third row of Table 1, there is shown the results of the measurement made on a system wherein the tiplets were mounted on the lower surface of the impeller blades at the tips and approximately 7 inches in from the tips thereof. Once again the tiplets spanned the width of the impeller blades and extended downwardly for a distance of approximately 2.5 inches. Although this configuration did not show quite as much improvement as previous configurations there was still an increase of 10 percent in the relative gas dispersion capability and a relative increase of approximately 4.2 percent of gas dispersion compared to consumed power increase.

Row 4 depicts the results utilizing an impeller having tiplets disposed on both the top and bottom surfaces of the impeller blades at the tips thereof. The tiplets spanned the width of the impeller blades and extended approximately 2.5 inches above and below the upper and lower surfaces thereof, respectively. Although this configuration exhibited a 10% increase in the relative gas dispersion capability, there was only a 1% relative increase of gas dispersion capability compared to consumed power increase. Finally, Row 5 sets forth the results utilizing tiplets disposed at the ends of the impeller blades and depending downwardly from the lower surfaces thereof for a distance of from approximately 4.5 inches at the leading edge to 2.5 inches at the trailing edge. As shown in Table 1, this configuration exhibited the best results in that the increase in relative gas dispersion capability was approximately 12.6%, while the relative increase of gas dispersion capability compared to consumed power increase was approximately 7.7%.

As can be seen from Table 1, each of the four alternate embodiments of the present invention listed therein showed a substantial increase in the relative gas dispersion capability ranging from approximately 10% to approximately 12.6% over the prior art hydrofoil impeller. Furthermore, all exhibited a relative increase of the gas dispersion capability compared to consumed power increase with the best results obtained from those alternate preferred embodiments wherein the single tiplets, mounted near the tips of the impeller blades, depended downwardly from the lower surfaces of the impeller blades.

Figure 5:
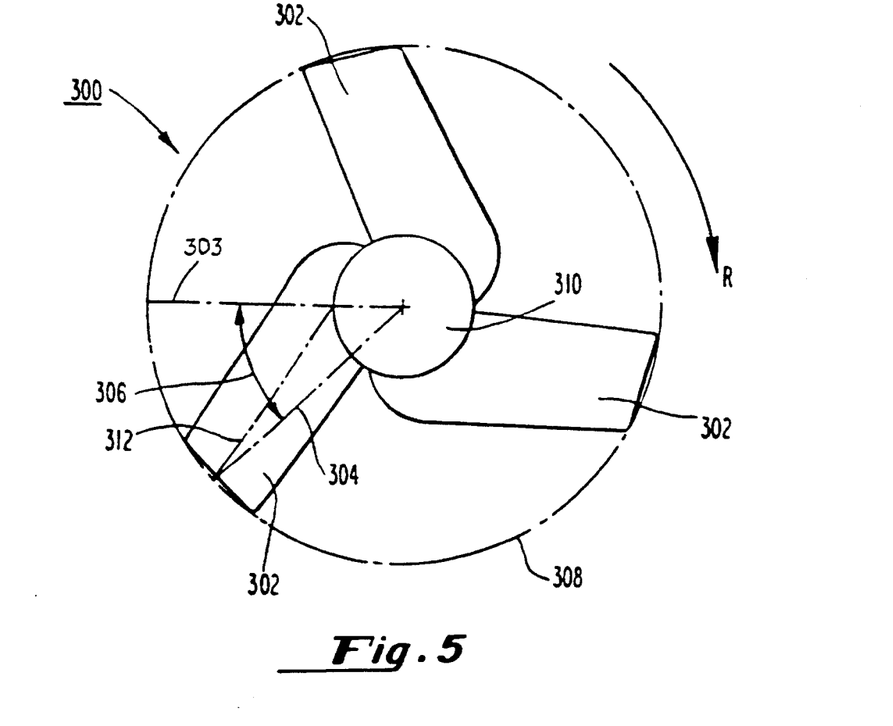
FIG. 5 is a top plan view of an impeller having blades which are swept back from a substantially radial orientation by a predetermined amount in the accordance with the present invention.
Figure 6:
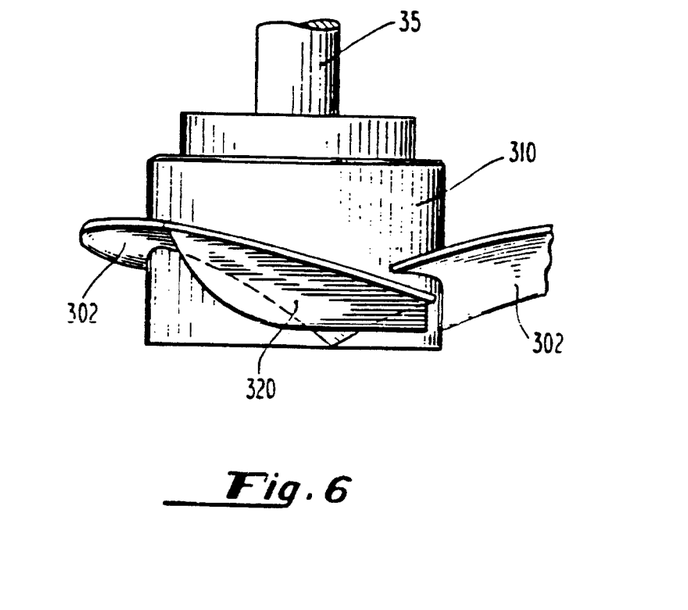
FIG. 6 is a side elevational view of portion of a preferred embodiment of an impeller having swept back blades and tiplets mounted thereon in accordance with the present invention.

Referring now to FIG. 5, there is shown a top plan view of an alternate embodiment of the present invention comprising an impeller, generally designated 300, having tiplets 320 depending downwardly from the lower surfaces of impeller blades 302 (see FIG. 6). This alternate embodiment impeller 300 is particularly suitable for those applications wherein the fluid involved, for example wastewater, contains foreign objects or debris such as rags, strings and the like. As previously stated, such debris tended to accumulate on the leading edges of the impeller blades. This phenomenon was simulated by installing a draft tube mixing apparatus, containing a hydrofoil impeller having blades radially extending from the hub, in a 40 foot by 50 foot tank of clean water not containing the aforementioned debris. The power drawn by the electric motor driving the impeller remained essentially constant until foreign material was added to the tank. In this experiment, the foreign material comprised three 5 gallon buckets of rags, torn into strips of approximately 2 inches wide by 6 inches long. This material closely simulated debris observed to oftentimes be present in wastewater flowing into secondary treatment basins from relatively ineffective primary treatment sections of wastewater treatment plants.

Following the addition of the rags, the horsepower drawn by the electric motor began to increase. This increase in power drawn continued for approximately the next half hour until the apparatus was shut down. Just prior to shut down, the power drawn by the electric motor had increased approximately 40% over the power drawn prior to the addition of the rags. Following shut down, the apparatus was restarted at initial motor loading substantially equal to that in clean water, and again the power drawn by the electric motor began to increase. This increase continued until the apparatus was once again shut down, approximately 55 minutes after start up. Just prior to this shut down, the power drawn by the electric motor had increased by approximately 50%. It was discovered that the presence of specific foreign objects in the simulated wastewater causes a significant increase in the power drawn by the electric motor used to rotate impellers having a radial blade orientation, due to accumulation of foreign material on the impeller blades. Smaller scale testing proved that this accumulation was predominantly on the leading edges of such blades.

Referring again to FIG. 5, the impeller blades extend outwardly from a hub 310 which is connected to a shaft 35 (see FIG. 6). The blades 302 are swept back from the radial orientation in accordance with the following design. Starting with a radial blade centerline 303, a new radius 304 is drawn at a predetermined angle indicated by the double-headed arc 306 in a direction opposite to the direction of rotation (indicated by arrow R). Hereinafter, the angle 306 will be referred to as the sweep back angle.

A centerline 312 is then drawn from the intersection of the radius 304 with the circumference 308 described by the rotating tips of the impeller blades 302; and the intersection of the radial centerline 303 with the circumference of the hub 310; hub diameter and circumference vary between approximately 26% to 28% of impeller diameter and circumference. This centerline 312 is the basic centerline of the swept back blade 302. It is preferred that the sweep back angle 306 be 40°; however, impellers having blades with sweep back angles of 20° and 30° were constructed and tested, with both impellers showing improvement over impellers having blades with radial center lines. Higher than 40° sweep back angles can also be used to advantage.

It is preferred that the swept back impeller blades 302 be of the hydrofoil-type; that is, one of a family of impeller blade shapes specifically designed to maximize the axial flow component of the total amount of fluid flow generated by an impeller equipped with such blades when rotated in a mixing or aeration operation; conversely, when impellers with generally similar blade shapes are utilized in propulsion of aircraft or water craft, the design goal is to maximize thrust for moving the air or sea vehicle, per unit of rotational energy applied to the airfoil or hydrofoil blade-equipped rotating impeller. Specific optimum hydrofoil blade pitch angles to the horizontal plane at root and tip of the blade will vary somewhat depending upon impeller diameter and other considerations. Typical such angles for a 76 inch diameter impeller, with blade sweep back angle of 40°, are 22° root angle, 15° tip angle. The blades are twisted in smooth contours between these limits, and have pitch angles intermediate between root and tip angles at points in between. The blades are usually cambered and tapered—being narrower at the tip than at the root. It is also preferred that the leading edges of the swept back impeller blades 302 be rounded and polished, preferably to a 100–120 grit finish, with the polished area extending approximately 3 inches back from the leading edge and tip on both the top and bottom of the blade 302.

Referring now to FIG. 6, there is shown a side elevational view of a portion of the impeller 300 showing the tiplets 320 depending downwardly from the lower surfaces of the swept back impeller blades 302 in proximity to the tips thereof. It is preferred that the tiplets 320 span the entire width of the swept back impeller blade 302 as shown in FIG. 6. In this tiplet embodiment, where tiplet vertical depth is near a maximum for hydraulic effectiveness, it is preferred for purposes of closest impeller positioning above the sparge device that the bottom edge of each tiplet 320 as it approaches the trailing edge of the blade lie in a substantially horizontal plane as shown in FIG. 6. In addition, it is preferred that the leading edge of the tiplet 320 have a radius of curvature which extends from the point where the leading edge of the tiplet 320 joins the bottom surface of the swept back blade 302, to the substantially horizontal bottom edge of the tiplet 320. In one embodiment, where the impeller diameter is approximately equal to 76 inches, and each swept back blade has a width of approximately 11½ inches at the tip thereof, the thickness of each tiplet is approximately ⅜ inch; the radius of curvature at the tiplet leading edge is approximately 10 inches with the leading edge being rounded to a 3/16 inch radius; the length of the substantially horizontal bottom edge is approximately 5 inches; and the height of the trailing edge, from the bottom edge to the point at which the trailing edge joins the lower surface of the blade 302 is approximately 2¼ inches. Finally, it is preferred that the tip of the swept back impeller blade 302 as well as the tiplet 320 depending therefrom have a radius of curvature which is substantially equal to that of the circle the tiplet describes when the impeller is rotating.

Figure 7:
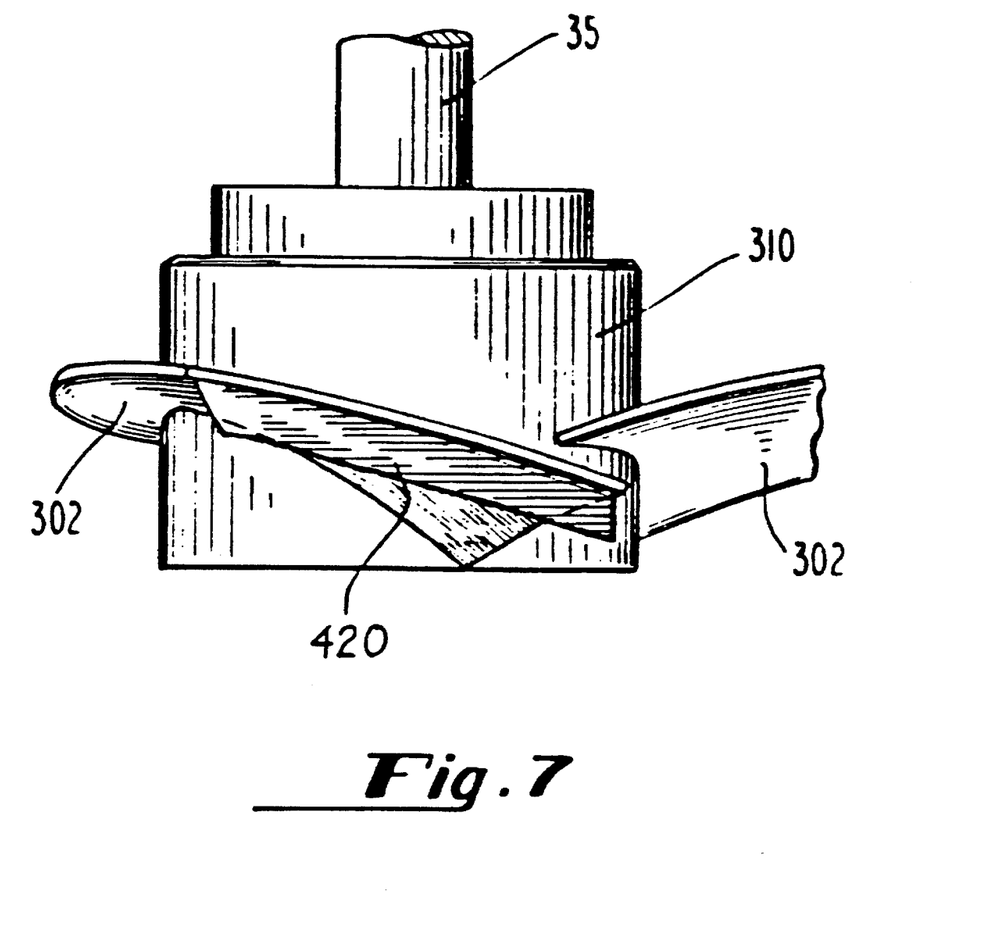
FIG. 7 is a side elevational view of a portion of an alternate preferred embodiment of an impeller having swept back blades and tiplets mounted thereon in accordance with the present invention.

Referring to FIG. 7, there is shown a side elevational view of a portion of the impeller 300 showing yet another embodiment of tiplets 420 depending downwardly from the lower surfaces of the swept back impeller blades 302 in proximity to the tips thereof. It is preferred that the tiplets 420 span the entire width of the swept back impeller blade 302 as shown in FIG. 7. Furthermore, it is preferred that the tiplets 420 of this embodiment extend downwardly by a uniform amount, for example approximately 1 inch, throughout its length L. In addition, it is preferred that the leading edge of each tiplet be bevelled and rounded in order to prevent the accumulation of debris thereon. In one embodiment, where the impeller diameter is approximately equal to 86 inches, each swept back blade has a width of approximately 15½ inches at the tip thereof; the thickness of each tiplet is approximately ⅜ inch; the tiplet leading edge is rounded to approximately 3/16 inch with the leading edge being bevelled at approximately a 45° angle; and the height H (that is, the distance to which the tiplet extends from beneath the lower surface of the blade 302) is substantially uniform across its width and equal to approximately 1 inch. Finally, it is preferred that the tip of the swept back impeller blade 302 as well as the tiplet 420 depending therefrom have a radius of curvature in plan view which is substantially equal to that of the circle the tiplet describes when the impeller is rotating.

Figure 8:
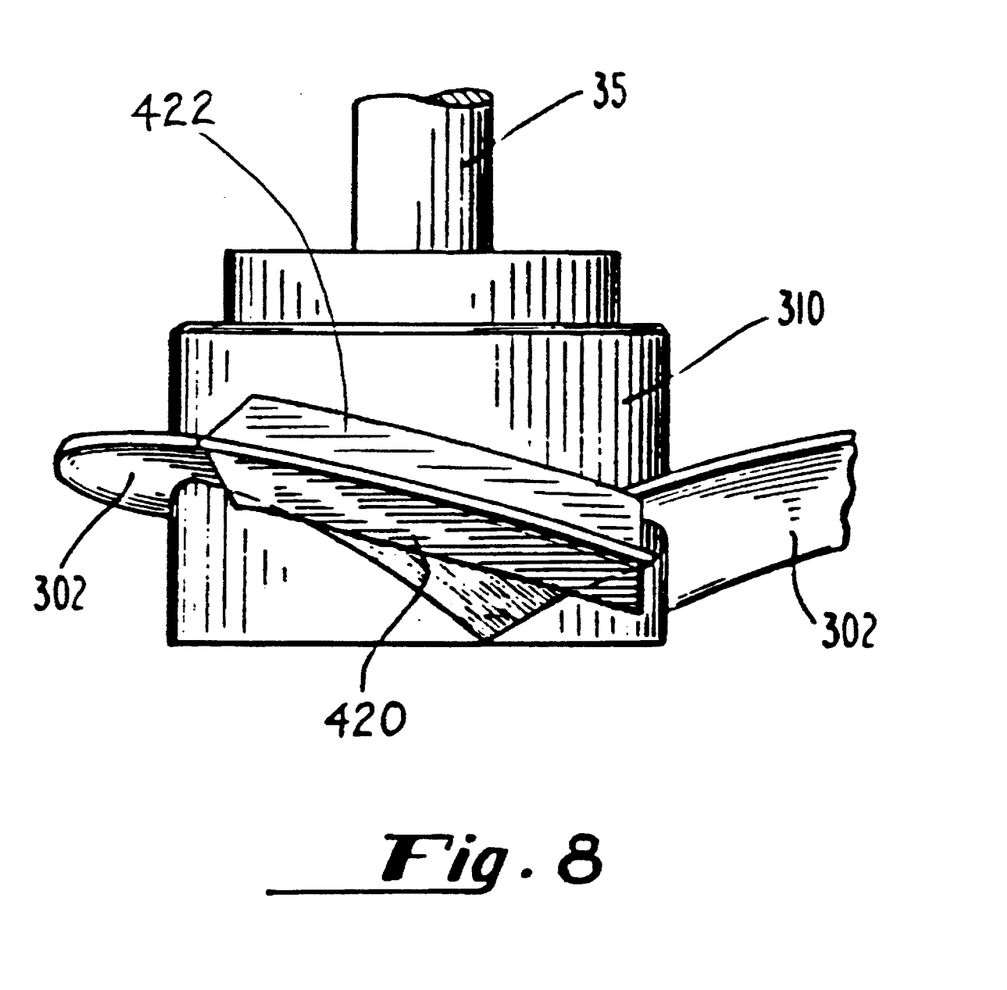
FIG. 8 is an elevational view of an end of an impeller blade depicting tiplets extending both upwardly and downwardly from the impeller blade in accordance with an alternate preferred embodiment of the present invention.

Referring now to FIG. 8, there is shown an alternate preferred embodiment of an impeller 300 constructed in accordance with the present invention. In this alternate preferred embodiment, tiplets 422 extend upwardly from the upper surfaces of the swept back impeller blades 302 in proximity to the tips thereof; and tiplets 420 extend downwardly from the lower surfaces of the swept back impeller blades 302 in proximity to the tips thereof. It is preferred that the tiplets 420 and 422 span the entire width of the swept back impeller blade 302 as shown in FIG. 8. In one embodiment, where the impeller diameter is approximately equal to 86 inches, the tiplet 420 extends downwardly from the lower surface of the impeller blade 302 approximately 2½ inches, and the tiplet 422 extends upwardly from the upper surface of the impeller blade 302 approximately 2 ½ inches.

Table 2 contains data taken with respect to an impeller in accordance with the present invention, having blades with a sweep back angle of 20°. The impeller was 76 inches in diameter and was rotatably mounted within a 78.5 inch OD draft tube. The blades had a 20 degree root angle and a 12 degree tip angle. Each blade had a tiplet depending downwardly therefrom in proximity to the tip thereof in accordance with the present invention. The impeller was rotated by a 125 horsepower electric motor at 140.5 RPM. The impeller was mounted within a draft tube which was installed in a 40 foot by 50 foot basin having a 26 foot liquid depth. The apparatus included a sparging device for inducing compressed air, disposed within the vertical draft tube beneath the impeller. Table 2 lists, in the column at left, the amount of air introduced to the sparging device in SCFM. The electric motor input power drawn, as measured by a wattmeter, is listed in the center column; and, the pattern of air movement in the fluid within the tank is contained in the right column. The measurements entered in this table represent operation in the tank containing water without rags.

Table 3 contains data taken with respect to a 76 inch diameter impeller having blades with a sweep back angle of 30°. The blades have a 21 degree root angle and a 14 degree tip angle and also have tiplets depending downwardly therefrom in proximity to the tips thereof in accordance with the present invention. The impeller was rotatably mounted within a 78.5 OD vertical draft tube above an air sparging device. The assembly was mounted within a 40 foot by 50 foot basin having a 26 foot liquid depth with rags previously added to the liquid. The impeller was driven by a 125 horsepower electric motor at 140.5 RPM. As shown in Table 3, the power draw of the apparatus remains substantially constant as introduction of air was increased from 200 SCFM to 675 SCFM. The apparatus flooded at 700 SCFM. Tables 4, 5, 6 and 7 contain data related to the testing of an impeller with blades having sweep back angle of 40° and which have tip angles of 15° and root angles of 22°. All blades have tiplets depending downwardly therefrom in the vicinity of the tips of each blade. All of the tests represented by these tables were conducted in a 40 foot by 50 foot basin having a 26 foot liquid depth with rags disposed therein. The impeller was driven by a 125 horsepower motor at 140.5 RPM. The impeller was 76 inches in diameter and was operating within a 78.5 inch OD draft tube above an air sparging device.

The impeller, for which the test results are shown in Table 4, was painted with a standard primer paint. The blades had a 38 inch radius leading edge along an 8 inch length. The impeller, for which the data contained in Table 5 were taken, was constructed of stainless steel and had polished leading edges. As shown by comparing Table 4 with Table 5, the stainless steel impeller with the polished leading edges was able to operate at higher air introduction rates, that is, 770 SCFM, than was the impeller painted with the standard primer paint, which flooded at 695 SCFM as shown in Table 5.

The data contained in Table 6 were taken with respect to an impeller constructed of stainless steel, the blades having a 180 inch radius on the leading edge, and the leading edges were polished. Once again, this impeller was able to operate with air being introduced through the sparging device in excess of 750 SCFM without flooding. Table 7 contains data taken with respect to an impeller constructed of stainless steel having blades with 120 inch radius leading edges, which leading edges were also polished. Once again, it can be seen that the impeller was operable with only a very slight increase in power draw at air introduction levels which exceeded 675 SCFM without flooding.

It should be noted that all of the embodiments shown and described herein, including those set forth in Tables 1–7, are considered to be within the scope of the present invention.

As can be seen from the aforementioned description, the impeller of the present invention is able to operate in liquids containing foreign materials without a degradation in pumping and gas transfer efficiencies, and without experiencing an increase in power draw. This is due to the fact that the swept back blades are self-cleaning in that they are able to throw off accumulated foreign material as the impeller continues to rotate. As a result, the foreign material is not permitted to accumulate to any sufficient degree, thereby preventing degradation in pumping and gas dispersion efficiency and causing an increase in power draw. In addition, the tiplets added to the blades of the impeller of the present invention create an increase in the relative gas dispersion capability over those without the tiplets. Furthermore, all embodiments exhibited a gain in gas dispersion capability due to the increase in downward pumping efficiency.

In addition to the aforementioned advantages of the present invention, addition of the tiplets to the impeller blades affords an additional opportunity to mechanically balance the impeller. That is, the tiplets may be used as static balancing weights by varying their thickness. Furthermore, it has been found that the addition of tiplets to the impeller blades imparts an advantage in that, when flooding occurs during operation, it is not necessary to effect a substantial reduction in air flow prior to restart. Utilizing prior art impellers, it was often necessary to reduce the air flow substantially once the impeller flooded. Utilizing the impeller of the present invention, it is only necessary to reduce the air flow to an operating control point at which air dispersion without flooding had previously proved possible, and to maintain the air flow at this magnitude thereafter. Furthermore, unlike the prior art, it is now always possible to stop and restart the impeller, and effectively disperse such operating point air flow without adjusting such air flow at all.

One advantage in not having to substantially reduce the air flow after flooding is that, if a pressure spike in the air line from the compressor occurs causing a momentary increase in air flow, which in turn causes flooding, the impeller will continue to operate effectively once the air flow has returned to pre-spike magnitude. In the prior art, a momentary increase in air flow caused by a spike in the compressor would often necessitate a substantial reduction in the air flow, in some cases to zero, then a gradual and slow increase to the pre-spike magnitude. Consequently, the need for operator readjustment of the air flow is eliminated when using the impeller of the present invention.

It will be understood that various changes in the details, materials and arrangements of parts which have herein described and illustrated in order to explain the nature of this invention may be made by those skilled in the art within the principle and scope of the invention as expressed in the following claims.

TABLE 1

| 86" DIAMETER HYDROFOIL IMPELLER TIP VARIATION | RELATIVE GAS DISPERSION CAPABILITY | GAIN: RELATIVE INCREASE OF GAS DISPERSION CAPABILITY COMPARE TO CONSUMED POWER INCREASE |
| --- | --- | --- |
| Unmodified (without Tiplets) | 100% | 1.0 |
| With 2½" constant depth Tiplets @ tips on bottoms of blades | 111.3% | 1.075 |
| With 2½" constant depth Tiplets @ tips & 7" in from tips | 110% | 1.042 |

TABLE 1-continued

| 86" DIAMETER HYDROFOIL IMPELLER TIP VARIATION | RELATIVE GAS DISPERSION CAPABILITY | GAIN: RELATIVE INCREASE OF GAS DISPERSION CAPABILITY COMPARE TO CONSUMED POWER INCREASE |
|---|---|---|
| on bottoms of blades With 2½" constant depth Tiplets @ tips | 110% | 1.01 |
| on bottoms & tops of blades With Tiplets varying in depth from 4½" @ leading edges to 2½" @ trailing edges on bottom of blades | 112.6% | 1.077 |

TABLE 2

| SCFM | Wattmeter HP | PATTERN |
|---|---|---|
| Ungassed | 65.66 | |
| 300 | 61.64 | Air going to all four walls. |
| 500 | 62.98 | Air going to all four walls. |
| 600 | 64.32 | Air going to all four walls. |
| 650 | 62.98 | Floods. |

TABLE 3

| SCFM | With Rags in Tank Wattmeter HP | PATTERN |
|---|---|---|
| Ungassed | 67.00 | |
| 200 | 79.06 | Air to all walls. |
| 400 | 80.40 | Air to all walls. |
| 600 | 79.06 | Air to all walls. |
| 621 | 80.40 | Air to all walls. |
| 630 | 79.06 | Air to all walls. |
| 648 | 79.06 | Air to all walls. |
| 675 | 79.06 | Air to all walls. |
| 700 | | Floods. |

TABLE 4

| SCFM | With Rags in Tank Wattmeter HP | PATTERN |
|---|---|---|
| Ungassed | 71.02 to 76.38 | |
| 200 | 79.06 | Air going to all four walls. |
| 400 | 81.74 | Air going to all four walls. |
| 600 | 81.74 | Air going to all four walls. |
| 650 | 80.40 to 77.72 | Air going to all four walls. |
| 685 | 76.38 | Air going to all four walls. |
| 695 | 73.70 | Flood. |

TABLE 5

| SCFM | Rags in Tank Wattmeter HP | PATTERN |
|---|---|---|
| Ungassed | 73.70 to 76.38 73.70 | |
| 200 | 73.70 to 75.04 73.70 | Air to all four walls. |
| 400 | 73.70 to 75.04 | Air going to all walls. |
| 600 | 76.38 | Air going to all walls. |
| 650 | 76.38 | Air going to all walls. |
| 710 | 76.38 | Air going to all walls. |
| 750 | 76.38 | Air going to all walls. |
| 770 | 76.38 | Air going to all walls. |
| 800 | Running time limited by support system flexibility. | |
| 900 | Running time limited by support system flexibility. | |

TABLE 6

| SCFM | Rags in Tank Wattmeter HP | PATTERN |
|---|---|---|
| Ungassed | 73.70 to 80.40 | |
| 200 | 75.04 to 76.38 | Air going to all walls. |
| 400 | 75.04 to 73.70 | Air going to all walls. |
| 500 | 75.04 | Air going to all walls. |
| 600 | 75.04 | Air going to all walls. |
| 650 | 76.38 | Air going to all walls. |
| 700 | 76.38 | Air going to all walls. |
| 750 | | Air going to all walls. |

TABLE 7

| SCFM | Rags in Tank Wattmeter HP More rags added. | PATTERN |
|---|---|---|
| Ungassed | 72.36–73.03 | |
| 200 | 75.04 | Air going to all walls. |
| 400 | 75.04 | Air going to all walls. |
| 600 | 75.04 | Air going to all walls. |
| 675 | 76.38 | Air going to all walls. |

We claim:

1. A draft tube submerged turbine mixer/aerator apparatus comprising:

(a) a substantially vertically oriented draft tube having an upper conical inlet portion and a lower cylindrical portion, both extending along a central longitudinal axis;

(b) aeration means disposed in said cylindrical portion for introducing gas into liquids flowing through said draft tube; and (c) impeller means, rotatably disposed in said conical inlet portion above said aeration means, for pumping said fluids downwardly from said conical inlet portion through said cylindrical portion past said aeration means, said impeller means comprising:

(i) a shaft having a central longitudinal axis which is substantially co-axial with the central longitudinal axis of said draft tube;

(ii) a hub attached to a lower end of said shaft;

(iii) at least two blades extending outwardly from said hub in a lateral direction for rotation about said shaft axis; and (iv) tiplet means consisting of a single tiplet attached to and disposed only downwardly from a lower surface of each blade transverse to said lateral direction, each of said tiplets positioned in proximity to a tip of each blade wherein a lower edge of said single tiplet on each blade lies in a plane which is substantially coplanar with a plane containing the intersection of said conical portion and said cylindrical portion of said draft tube.

2. The apparatus in accordance with claim 1 wherein said blades extend radially outward from said hub.

3. The apparatus in accordance with claim 1 wherein said outwardly extending blades are swept back from a radial orientation by a predetermined sweep back angle.

4. The apparatus in accordance with claim 3 wherein said sweep back angle has a magnitude in a range of from approximately 10° to approximately 50°.

5. The apparatus in accordance with claim 4 wherein the magnitude of said sweep back angle is approximately 40°.

* * * * *